Feb. 27, 1962 J. ISABEAU 3,023,321

TRANSISTOR SWITCHING APPARATUS WITH LEAKAGE RESISTANCE STABILIZING MEANS

Filed Feb. 15, 1960 2 Sheets-Sheet 1

INVENTOR.
John Isabeau
BY James E. Tracy
Atty.

INVENTOR.
John Isabeau
BY James E. Tracy
Atty.

United States Patent Office 3,023,321
Patented Feb. 27, 1962

3,023,321

TRANSISTOR SWITCHING APPARATUS WITH LEAKAGE RESISTANCE STABILIZING MEANS

John Isabeau, Mountain View, Calif., assignor to Zenith Radio Corporation, a corporation of Delaware Filed Feb. 15, 1960, Ser. No. 8,633
7 Claims. (Cl. 307—88.5)

Figure 1:
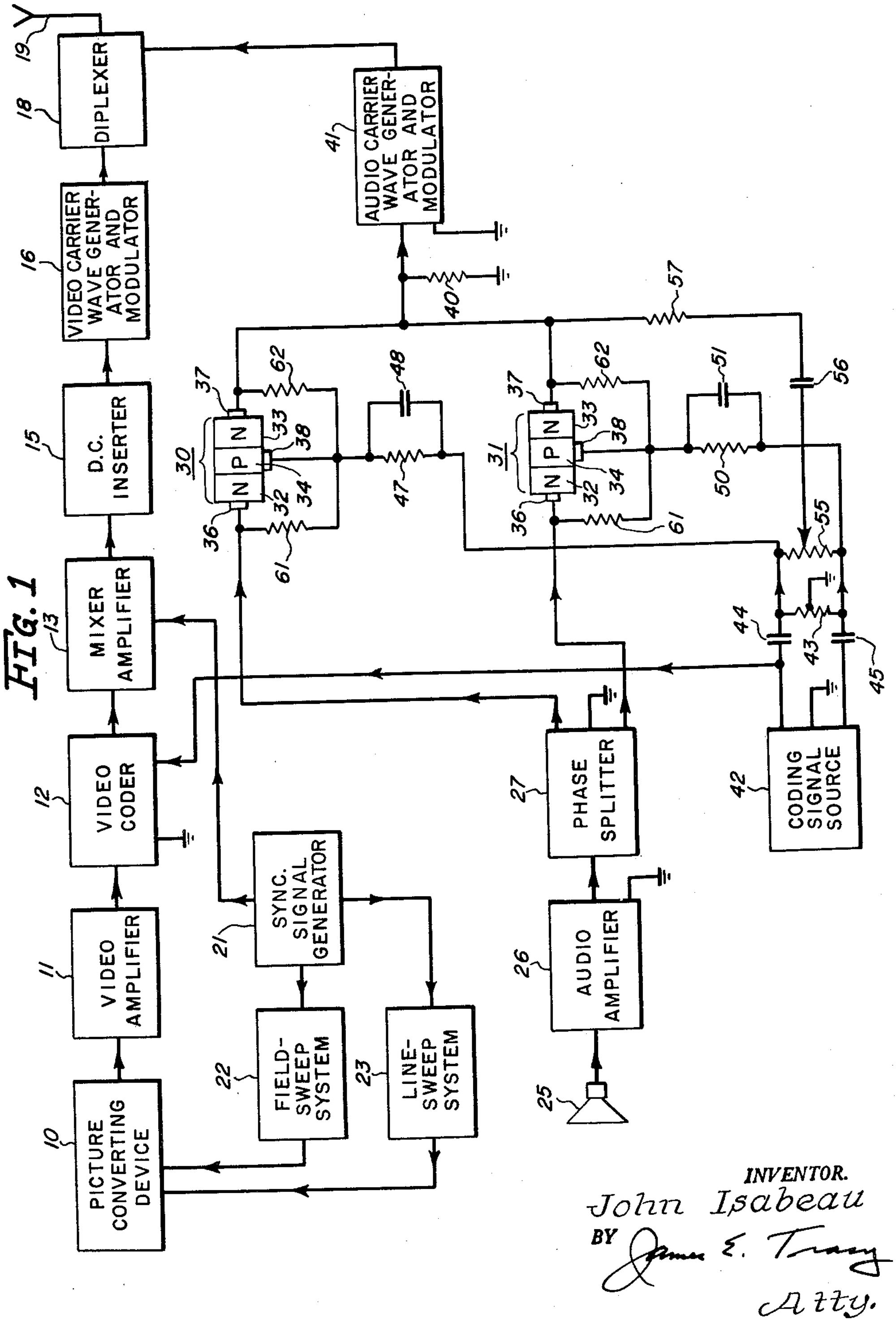

This invention pertains in general to switching apparatus, and more particularly to a switching arrangement in which a transistor serves as an electronic on-off switch for intermittently translating an input signal to a load. The inventive concept may be employed in a wide variety of environments but for illustrative purposes is shown incorporated in the audio coding apparatus of a secrecy or subscription television system.

In electronic switching apparatus of the type wherein selected portions of an input signal are translated to an output load under the control of an alternating switching signal, it is difficult and usually expensive to insure that no switching component manifests itself in the load as undesired distortion. When the switch takes the form of an electron-discharge device or vacuum tube it is difficult to avoid the introduction of a spurious, undesired signal consisting of potential fluctuations at the switching occurrences. This undesired switching component is caused by, inter alia, a drifting or changing of the operating characteristics of the electronic switch and may be attributable to several different factors. For example, if the control potentials applied to the switch vary, the operating characteristics will likewise change. Consequently, an extremely close degree of control as to the amplitude of the applied potentials is required. As another example, drifting of the operating characteristics of the switch may be effected by microphonics or mechanical vibrations that result in an actual displacement, be it ever so slight, of the physical electrodes or elements of the tube.

By utilizing a semi-conductor device, such as a transistor, certain of the shortcomings of the tube-type switch are overcome. In the first place, a transistor is not subject to microphonics. Moreover, only one operating or control potential is needed and the circuit may be so arranged that if it varies in magnitude it will have no bearing on the output signal and it will not produce a switching component. However, due to the fact that a transistor, when rendered non-conductive or turned "off" may translate undesired leakage current to the load, as a result of leakage current flowing through a PN junction of the semi-conductor, an undesired switching signal component of relatively small magnitude may nevertheless be developed. An arrangement for cancelling this undesired switching component is disclosed in copending patent application Serial No. 661,804, filed May 27, 1957, in the name of Adrian J. De Vries et al., and assigned to the present assignee. Cancellation is there achieved by applying to the load a compensating signal having the same wave shape as, but opposite in phase with respect to, the undesired switching component. A variable potentiometer permits precise adjustment in order that the current in the load resulting from the leakage resistance of the PN junction may be exactly balanced out.

While the copending De Vries et al. application constitutes a considerable improvement over prior semi-conductor switching apparatus, it is possible that variations in temperature which vary the magnitude of leakage resistance may upset the balanced condition, resulting in a manifestation of the switching component in the load. Additionally, since the leakage resistance is dependent upon the characteristics of the individual transistor, a substitution of the transistor in the circuit may require a re-adjustment of the compensating or cancelling circuit.

The present application constitutes an advancement over the De Vries et al. arrangement in that the undesired component of load current, due to the effect of leakage resistance of a PN junction in a semi-conductor switching device, is made relatively constant and independent of any variations of that leakage resistance caused by temperature changes, substitution of a new transistor, or for any other reason.

It is an object of the invention, therefore, to provide a switching apparatus which has advantages over that disclosed in the copending De Vries et al. application.

It is another object of the invention to provide a new and improved switching apparatus which avoids the problems and difficulties of previous switching arrangements employing semi-conductor devices.

It is still another object of the invention to provide a transistor switching arrangement in which variations of the leakage resistance through a PN junction of the transistor are rendered ineffective relative to the current supplied to a load.

It is a further object of the invention to insure that any undesired component of current in the load circuit of a transistor switch, resulting from leakage current flowing through a PN junction of that transistor, is made relatively constant and immune from leakage-resistance variations.

A switching apparatus, constructed in accordance with one aspect of the invention, comprises a semi-conductor device having a zone of P-type conductivity forming a PN junction with a zone of N-type conductivity. There are first, second and third terminals, and each of the zones is connected to an assigned one of the terminals. Between the zones there is a leakage resistance of a value susceptible of undergoing change. The semi-conductor device, in response to one voltage condition on the third terminal, assumes a conductive state wherein a relatively low impedance path is provided between the first and second terminals to permit current translation therebetween and, in response to another voltage condition on the third terminal, assumes a non-conductive state wherein a relatively high impedance path is provided between the first and second terminals to prevent the translation of current therebetween. There is a source of a signal and means coupling this source to the first terminal for supplying the signal thereto. A load circuit is coupled to the second terminal. There are means for developing an alternating switching signal and means for applying this switching signal to the third terminal to alternate the semi-conductor device between its conductive and non-conductive states intermittently to translate the signal from the source to the load circuit. The semi-conductor device translates undesired current to the load circuit as a result of undesired leakage current flowing through the PN junction. Finally, the switching apparatus includes a fixed resistor, of a value not greater than the leakage resistance, connected between those of the terminals connected to the zones in order that the undesired current in the load circuit be relatively constant and independent of any variations of the leakage resistance.

Figure 2:
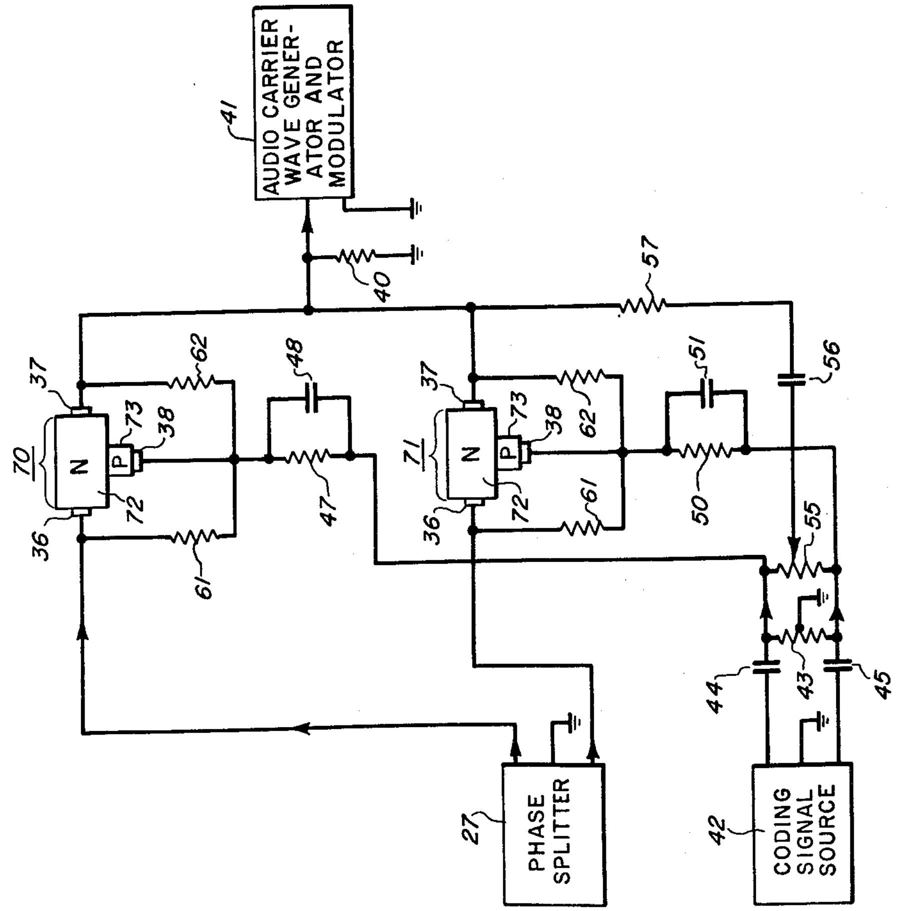

The features of this invention which are believed to be novel are set forth with particularity in the appended claims. The invention, together with further objects and advantages thereof, may best be understood, however, by reference to the following description taken in conjunction with the accompanying drawings, in the figures of which like reference numerals identify like elements, and in which:

FIGURE 1 is a schematic representation of a subscription television transmitter including a switching apparatus constructed in accordance with one embodiment of the invention; and FIGURE 2 represents a portion of the transmitter of FIGURE 1 constructed in accordance with another embodiment of the invention.

Before turning to a structural description of the embodiment of FIGURE 1, it should be mentioned that, with the exception of the elements required to practice the present invention, all of the circuits illustrated therein are also shown in the copending De Vries et al. case, Serial No. 661,804.

The transmitter of FIGURE 1 includes a picture-converting or pick-up device 10 which may be of any well-known construction for deriving a video signal representing an image to be televised. The output terminals of device 10 are connected through a video amplifier 11 and a video coder 12 to one pair of input terminals of a mixer amplifier 13. Video coder 12 may be similar to that disclosed and claimed in Patent 2,758,153, issued August 7, 1956, to Robert Adler, and assigned to the present assignee. It may comprise a beam-deflection tube having a pair of collector anodes connected respectively to a pair of output circuits which may be selectively interposed into the video channel as the electron beam is deflected from one to the other of the two anodes. One of these output circuits includes a delay line so that the timing of the video components relative to the synchronizing components of the radiated television signal varies as the beam of the deflection tube is switched between its anodes. This switching effect is accomplished by means of a beam deflection-control or actuating signal applied to video coder 12, as will be explained. Varying the relative timing of the video and synchronizing components from time to time effectively codes the picture information since conventional television receivers, not containing video decoding apparatus, require a constant time relation between the video and synchronizing components to effect faithful image reproduction.

Mixer 13 is coupled through a direct current inserter 15 to a video carrier wave generator and modulator 16 which, in turn, is connected through a diplexer 18 to an antenna 19. The transmitter also includes a synchronizing signal generator 21 which supplies the customary field- and line-synchronizing components and associated pedestal or blanking components to mixer 13. Generator 21 further supplies field- and line-drive pulses to a field-sweep system 22 and to a line-sweep system 23, respectively. The output terminals of sweep systems 22 and 23 are connected respectively to the field- and line-deflection elements (not shown) associated with picture-converting device 10.

A microphone 25, for picking up the sound information, is connected through an audio amplifier 26 to a phase splitter 27 which has a balanced output circuit supplying signals in push-pull relation or phase opposition to a pair of semi-conductor devices in the form of bi-directional transistors 30, 31. These transistors are of the conventional junction type and of the same gender; for convenience, transistors 30 and 31 are illustrated as being of the NPN type, although it will be appreciated that similar results may be achieved with a pair of PNP transistors. Each has first and second outer zones 32, 33 of one conductivity type, namely N type material, on opposite sides of and contiguous with an intermediate zone 34 of the opposite conductivity type, namely P type material. Substantially ohmic terminals or connections 36, 37 and 38 are made to the three zones 32, 33, 34, respectively, of each transistor 30, 31. Each of the illustrated transistors has, of course, two PN junctions, namely one junction between zones 34 and 32 and another junction between 34 and 33.

As is inherent in the operation of a conventional junction-type transistor, each of transistors 30, 31 is responsive to the forward biasing of its intermediate zone 34 with respect to both of its outer zones (for the case of an NPN transistor, the forward biased condition is that in which intermediate zone 34 is positive with respect to zones 32 and 33) for assuming a conductive state wherein a relatively low impedance path is provided between its first and second outer zones 32, 33, respectively, to permit bi-directional current translation therebetween. On the other hand, each of NPN transistors 30, 31 responds to the reverse biasing of its intermediate zone (namely by establishing zone 34 at a negative potential with respect to both of its outer zones) for assuming a non-conductive state wherein a relatively high impedance path is provided between its first and second outer zones 32, 33 to prevent the translation of current therebetween.

One side of the balanced output circuit of phase-splitter 27 is connected to terminal 36 of transistor 30 and the other side is connected to terminal 36 of transistor 31 so that the intelligence or audio signal, which may be broadly classified as a varying signal, is applied with opposed phases to the first outer zones 32. The two terminals 37 are connected in common and to one side of a load resistor 40, the other side of which is connected to a plane of reference potential such as ground, so that both of the second outer zones 33 of the transistor are coupled to the load. Resistor 40 is coupled across the input terminals of an audio carrier wave generator and modulator 41 which in turn is coupled to another input circuit of diplexer 18.

In order to achieve both sound and picture coding in accordance with a secret code schedule, a coding or switching signal source 42 is provided to produce a phase-modulated rectangular shaped coding signal. The manner in which the alternating coding or switching signal may be developed and information concerning its phase or other significant characteristic may be conveyed to subscriber receivers is entirely immaterial to the present invention. Attention is directed to issued Patents 2,852,598, issued September 16, 1958, in the name of Erwin M. Roschke, and 2,910,526, issued October 27, 1959, in the name of Walter S. Druz, both of which are assigned to the present assignee, and any one of which discloses a coding or switching signal source suitable for use as unit 42. The phase-modulated coding or switching signal developed in the coding signal source exhibits a mean frequency lying in the audible range and consequently will result in audible distortion if a switching frequency component is permitted to be superimposed on the coded audio developed for transmission to the receivers.

Source 42 has a balanced output circuit to provide oppositely-phased output signals. The two output terminals are connected together through a series arrangement comprising a condenser 44, a resistor 43 center tap to ground, and a condenser 45. Only one of the output signals is needed to effect actuation of video coder 12 and thus only one terminal of the balanced output of source 42 is connected to the deflection elements of coder 12. Since transistors 30, 31 are of the same gender and inasmuch as they must be turned "on" and "off" in alternation, both of the oppositely-phased switching signals are employed. Thus, the junction between condenser 44 and resistor 43 is connected to terminal 38 of transistor 30 via the parallel combination of a current-limiting resistor 47 and a condenser 48; this condenser is provided to "sharpen" the amplitude excursions of the rectangular shaped switching signal. Likewise, the junction between condenser 45 and resistor 43 is connected to terminal 38 of transistor 31 through a current-limiting resistor 50 which is bypassed by a condenser 51. This condenser serves the same purpose as condenser 48. In order to cancel any undesired switching signal component that may be developed in load circuit 40 in a manner to be explained, a potentiometer 55 is bridged across resistor 43, and a variable tap of the potentiometer is connected through a condenser 56 and a resistor 57 to the ungrounded terminal of load resistor 40.

This switching component is due in part, as will also be explained later, to undesired leakage current flowing through the PN junctions of transistors 30, 31. The magnitude of the undesired current in the load is determined by the leakage resistance through the PN junctions and thus varies with changes of those resistances. However, in accordance with the present invention, such leakage resistance variations are rendered substantially ineffective with respect to the load current by shunting each one of the PN junctions with a fixed resistor of a value small compared to the leakage resistance of the junction which it shunts. Specifically, a fixed resistor 61 is connected between terminals 36 and 38 of each of transistors 30, 31 in order that the leakage resistance between zones 32 and 34 of each transistor is shunted. The resistance value of resistor 61 is selected to be not greater than, and preferably small compared to, the leakage resistance of the PN junction provided by zones 32 and 34 so that the resistance between terminals 36 and 38 is determined primarily by the value of resistor 61. Consequently, any variance of the leakage resistance of the PN junction formed by zones 32 and 34 of each transistor becomes insignificant due to the presence of fixed resistor 61.

Likewise, a fixed resistor 62 is connected between terminals 38 and 37 of each of transistors 30, 31 in order that the junctions formed by zones 34 and 33 in each of those transistors may be shunted by a fixed resistor of a value not greater than, and preferably small compared to, its leakage resistance. In this way the resistance between terminals 38 and 37 is determined principally by fixed resistor 62. Once again, any change of the leakage resistance between zones 34 and 33 in each of the transistors is of negligible effect on the resistance between terminals 38 and 37 due to the presence of fixed resistor 62.

In the operation of the described subscription television transmitter, picture-converting device 10 develops a video signal representing the program information to be televised, and this signal, after amplification in video amplifier 11, is supplied through a video coder 12 to mixer amplifier 13. Meanwhile, coding signal source 42 develops a rectangular shaped alternating coding or switching signal having two different amplitude levels for application to the deflection-control elements of the video coder in order effectively to vary the time relationship between the video components and the synchronizing components of the radiated signal. Mixer 13 also receives the usual line- and field-synchronizing and blanking pulses from generator 21 so that a coded composite television signal is developed therein. That signal is adjusted as to proper background level in direct current inserter 15 and is amplitude modulated on a picture carrier in unit 16. The modulated carrier is supplied through diplexer 18 to antenna 19 from which it is transmitted to subscriber receivers. Sweep systems 22 and 23 are synchronized by generator 21 in well known manner.

At the same time, the audio information accompanying the video information is picked up by microphone 25 and supplied through audio amplifier 26 to phase splitter 27 for application to terminals 36 of transistors 30, 31 in push-pull or phase opposition. Meanwhile, the alternating switching signal developed in source 42 is applied in phase opposition to terminals 38 of the transistors to forward bias the transistors to their respective conductive states in alternation, thereby to translate the opposed phases of audio to load resistor 40 in alternation. In other words, during each half cycle of the switching signal in which intermediate zone 34 of transistor 30 is positive with respect to its outer zones, that transistor is keyed "on" to translate the audio therethrough. During the same half-cycle interval, intermediate zone 34 of transistor 31 is established at a negative voltage condition with respect to its outer zones, rendering that transistor non-conductive. During the intervening half cycles the opposite conditions prevail and transistor 31 is "on" while transistor 30 is "off."

However, the transistor that is instantaneously non-conductive or "turned off" translates undesired leakage current through load circuit 40 while at the same time the other transistor, being in its conductive state, translates undesired bias current, or what is sometimes known as base current, through the load circuit in a direction opposite that of the leakage current.

There is not a complete cancellation for the obvious reason that the bias current from the conductive transistor is not equal to the leakage current from the non-conductive one. In practice, the leakage current is usually smaller. If the two transistors were identical in construction and the circuitry were completely balanced, the signal component resulting from the leakage and bias currents would have the same magnitude and flow in the same direction for each half cycle of the alternating switching signal. In other words, the undesired sginal component in resistor 40 would have the same magnitude and direction no matter which one of transistors 30, 31 was in its conductive state. In that event, there would be no voltage fluctuations in the load at the switching frequency.

However, as a practical matter the semi-conductor devices or transistors are not usually precisely the same in composition and the circuits are ordinarily not exactly balanced and thus voltage fluctuations are developed in load circuit 40, having a wave shape substantially the same as that of the alternating switching signal from coding signal source 42. In accordance with the teachings of the copending De Vries et al. application, Serial No. 661,804, a compensating signal having a wave shape corresponding to that of the undesired switching component in resistor 40 is derived from coding signal source 42 and applied to load resistor 40 to cancel the undesired load current. Since the coding signal is applied in push-pull across potentiometer 55, its center is effectively at ground or reference potential and thus the variable tap of potentiometer 55 may be manually adjusted to provide a compensating signal having the same wave shape and magnitude as the switching signal component in load 40 but of opposite phase with respect thereto. Moving the tap from one side of the center of potentiometer 55 to the other reverses the polarity or phase of the compensating signal, so that a compensating signal of the required magnitude and phase for any operating condition can readily be obtained.

By selecting portions of the two opposed phases of the audio signal applied to the transistors in accordance with a code schedule so that the audio is alternately translated to load resistor 40 with no phase change and with a phase inversion, effective scrambling is achieved. A coded audio signal is thus developed containing phase inversions that completely destroy its intelligibility. The coded audio signal is then applied to sound carrier unit 41 wherein it modulates an audio carrier. The modulated carrier is then applied through diplexer 18 to antenna 19 from which it is concurrently radiated with the video modulated carrier.

It is desirable that potentiometer 55 require only an initial "factory" adjustment to provide at all times thereafter proper cancellation of the switching-frequency voltage fluctuations. Even if any of the transistors requires replacement at a later date, it is nevertheless desirable that no readjustment of the potentiometer be necessary. In the absence of the present invention, however, these objectives are not always obtained. Ignoring resistors 61 and 62 for the moment, at the time an initial factory adjustment is made the leakage resistance through each of the PN junctions exhibits a certain value, but unfortunately this value is susceptible of undergoing change. Consider, for example, the leakage resistance through the PN junction formed by zones 34 and 33 of transistor 30. The initial adjustment of potentiometer 55 is dictated in part by the resistance of that PN junction. Assuming that there were no provisions for cancellation, when transistor 30 is reverse biased by establishing intermediate zone 34 at a negative potential with respect to zone 33, undesired leakage current flows from ground through load 40, terminal 37, zones 33, 34, terminal 38 and resistor 47 to source 42, because of the leakage resistance in the junction. Of course, with potentiometer 55 set up in accordance with the leakage resistance perfect bucking is realized. If that leakage resistance varies, however, due to a temperature change or in the event a different transistor is used as a replacement, the undesired current flowing through load circuit 40 as a result of that leakage current consequently is altered. This, of course, requires another adjustment of potentiometer 55.

According to the present invention by connecting fixed resistor 62 between terminals 38 and 37 of transistor 30 and by establishing its value to be small with respect to the leakage resistance between zones 34 and 33, any change in such leakage resistance has no material effect on the resistance between terminals 38 and 37. Thus, if potentiometer 55 is initially adjusted with resistors 62 incorporated as illustrated, there will be no need for readjustments, since the switching arrangement is immune from the effects of leakage resistance variations.

Shunting the PN junction formed between zones 32 and 34 of each of the transistors with fixed resistor 61 is also helpful in insuring that the undesired current in the load circuit due to leakage of the non-conductive transistor is made relatively constant. In the absence of resistor 61, when transistor 30, for example, is in its cut-off condition the leakage resistance between zones 32 and 34 causes current flow from phase splitter 27 through terminal 36, zones 32 and 34, terminal 38, and resistor 47 to source 42. The potential thus established at terminal 38 divides between (1) the resistance between terminals 38 and 37 (which will be finite whether resistor 62 is present or not) and (2) load 40. Of course, since the resistance between terminals 38 and 37 probably will be much higher than that of load 40, the leakage current between zones 32 and 34 is of considerably less importance than that between zones 34 and 33. However, it does contribute to a certain extent to the undesired current flowing through load 40 and thus it is also desirable to stabilize the resistance between terminals 36 and 38 with temperature changes and with replacement transistors. Once again, such stability is insured by means of resistor 61 having a value small relative to the leakage resistance through the PN junction formed by zones 32 and 34. In this way, the magnitude of the undesired current through load 40, as contributed by the leakage resistance between terminals 36 and 38, may be held relatively constant and at a magnitude determined almost exclusively by the fixed value of resistor 61.

The ratio of the shunting resistor to the leakage resistance of the junction shunted is not critical; as one example, the shunting resistor may be established at a value one-tenth of the shunted leakage resistance. Of course, the electrical sizes of resistors 61 and 62 should not be made so small that the audio signal is translated therethrough, when the transistor is "off," and manifests itself across load 40 with any significant amplitude. Actually, sufficient compensation, depending on the purpose to be achieved, may be realized by establishing the value of each shunting resistor to be equal to or less than (namely, not greater than) the value of the leakage resistance of each junction.

Since the transistors are not vulnerable to microphonics or mechanical vibrations, there is no possibility of variations in the operating characteristics as in the vacuum tube circuits which would have the deleterious result of producing switching fluctuations in the load. Additionally, there is only one control potential applied to transistors 30, 31 (namely, the alternating switching signal) and while this may vary in magnitude from time to time, thus changing the magnitude of the switching component in load resistor 40, the amplitude of the compensating signal from potentiometer 55 also varies accordingly so that cancellation is still realized. Consequently, there is no possibility of introducing switching fluctuations in the load due to potential variations.

By way of summary, the switching apparatus of the present invention includes a semi-conductor device, such as transistor 30, having a zone (zone 34) of P conductivity type forming a PN junction with a zone (zone 33) of N conductivity type. Terminals 36, 37, and 38 constitute respectively first, second and third terminals. Each of the zones is connected to an assigned one of the terminals. Specifically zone 34 is connected to third terminal 38 and zone 33 is connected to second terminal 37. Between zones 34 and 33 there exists a leakage resistance of a value susceptible of undergoing change. Semi-conductor device 30 in response to one voltage condition on third terminal 38 (namely, responsive to the forward biasing of zone 34) assumes a conductive state wherein a relatively low impedance path is provided between terminals 36 and 37 to permit current translation therebetween and responsive to another voltage condition on third terminal 38 (namely, responsive to the reverse biasing of the intermediate zone 34) semi-conductor device 30 assumes a non-conductive state wherein a relatively high impedance path is provided between first terminal 36 and second terminal 37 to prevent the translation of current therebetween.

Phase splitter 27 constitutes a source of a signal and the connection from that phase splitter to terminal 36 of transistor 30 constitutes means coupling the source to the first terminal for supplying the signal thereto. Resistor 40 is a load circuit which is coupled to second terminal 37. Coding signal source 42 may be considered means for developing an alternating switching signal and the circuitry from this source to third terminal 38 constitutes means for applying the switching signal to the third terminal to alternate semi-conductor device 30 between its conductive and non-conductive states intermittently to translate the signal from source 27 to load circuit 40.

The semi-conductor device translates undesired current to load circuit 40 as a result of undesired leakage current flowing through the PN junction. Specifically, when transistor 30 is in its "off" condition current may flow from ground and through load 40 and the PN junction formed by zones 34 and 33 to source 42. Fixed resistor 62 is connected between those of the terminals connected to zones 34 and 33 (namely, third terminal 38 and second terminal 37) and this resistor is of a value not greater than, and preferably small compared to, the leakage resistance of the PN junction in order that the undesired current in the load be relatively constant and independent of any variations of the leakage resistance.

Of course, the invention is not limited to any particular type of semi-conductor device and, in fact, is not even limited to a transistor. All that is necessary is a three-terminal semi-conductor device having at least one PN junction through which there is a leakage resistance of a value susceptible of undergoing change. To demonstrate the versatility of the present invention, the semi-conductor device takes the form of what is known as a "field-effect" transistor in the embodiment of FIGURE 2. As is evident from the identical reference numerals applied to most of the elements in FIGURE 2, the only change therein from FIGURE 1 resides in the type of semi-conductor device employed. More particularly, transistors 30 and 31 of FIGURE 1 have been replaced in FIGURE 2 by field-effect transistors 70 and 71, respectively. As is well known and as is illustrated in FIGURE 2, one form of field-effect transistor includes a single zone 72 of one conductivity type, such as N type, at opposite ends of which ohmic connections are made by terminals 36 and 37. A junction is formed somewhere along zone 72 with a zone 73 of the opposite conductivity, namely, P type. Terminal 38 in each of transistors 70, 71 provides an ohmic connection to zone 73.

As in the case of the embodiment of FIGURE 1, the rectangular shaped switching potential is applied to terminals 38 of transistor 70 and 71 in push-pull such that at any given instant one of terminals 38 is positive with respect to ground whereas the other terminal 38 is negative with respect to ground. When, for example, terminal 38 of transistor 70 is negative, that transistor is established in its conductive or "on" state and thus the audio signal from the upper output of phase splitter 27 is translated to load 40. At that time, of course, terminal 38 of transistor 71 is positive thus effectively "choking off" or "pinching" the flow of current between terminals 36 and 37 of that transistor. Consequently, transistor 71 is established in its non-conductive or "off" state. During the immediately following half cycle of the switching signal from source 42, terminal 38 of transistor 70 is positive, thus effectively cutting off the flow of current between terminals 36 and 37 of that transistor while at the same time terminal 38 of transistor 71 is established at a negative potential thereby permitting bi-directional current translation between terminals 36 and 37 of that transistor so that the audio supplied to load 40 is that which originates at the lower output terminal of phase splitter 27.

It will be noted that each of the field-effect transistors 70, 71 in FIGURE 2 has actually only one PN junction, although there are two leakage paths. When transistor 70, for example, is turned off, leakage current may flow from load 40 to terminal 37 and thence through zones 72 and 73 to terminal 38 and eventually to source 42, while simultaneously leakage current also may flow from the upper terminal of phase splitter 27 through terminal 36, zones 72 and 73, and terminal 38 to source 42. Consequently, since there are two leakage paths there is leakage resistance between terminals 38 and 37 as well as between terminals 38 and 36. Thus, both resistors 61 and 62 are desirable, connected of course in the same manner as in FIGURE 1 and established at values correlated to the values of the two leakage resistances.

While a receiver has not been specifically illustrated to demonstrate the manner in which the coded transmission of either the transmitter of FIGURE 1 or that of FIGURE 2 may be decoded, a suitable receiver for performing such a function is shown in the copending De Vries et al. application, Serial No. 661,804. It will be noted in that application that the switching apparatus used at the receiver for decoding is identical to that employed in the transmitter for initial scrambling. Consequently, the concept of the present invention may be equally applicable to the switching arrangement employed in the receiver.

The invention provides, therefore, a switching arrangement wherein a semi-conductor device, having at least one PN junction and interposed between a signal source and a load, is switched between its conductive and non-conductive states to effectively intermittently couple the source to the load. Undesired current may be translated to the load as a result of undesired leakage current flowing through the PN junction when the device is turned "off," but this load current may be stabilized, by means of a fixed resistor shunting the junction, at a relatively constant magnitude independent of any variation of the leakage resistance through the PN junction.

While particular embodiments of the invention have been shown and described, modifications may be made and it is intended in the appended claims to cover all such modifications as may fall within the true spirit and scope of the invention.

I claim:

1. Switching apparatus comprising: a semi-conductor device having a zone of P conductivity type forming a PN junction with a zone of N conductivity type and having first, second and third terminals, each of which zones is connected to an assigned one of said terminals and between which zones there is a leakage resistance of a value susceptible of undergoing change, said semi-conductor device in response to one voltage condition on said third terminal assuming a conductive state wherein a relatively low impedance path is provided between said first and second terminals to permit current translation therebetween and responsive to another voltage condition on said third terminal assuming a non-conductive state wherein a relatively high impedance path is provided between said first and second terminals to prevent the translation of current therebetween; a source of a signal; means coupling said source to said first terminal for supplying said signal thereto; a load circuit coupled to said second terminal; means for developing an alternating switching signal; means for applying said switching signal to said third terminal to alternate said semi-conductor device between its conductive and non-conductive states intermittently to translate said signal from said source to said load circuit, said semi-conductor device translating undesired current to said load circuit as a result of undesired leakage current flowing through said PN junction; and a fixed resistor, of a value not greater than said leakage resistance, connected between those of said terminals connected to said zones in order that the undesired current in said load circuit be relatively constant and independent of any variations of said leakage resistance.

2. Switching apparatus comprising: a bi-directional transistor having a zone of P conductivity type forming a PN junction with a zone of N conductivity type and having first, second and third terminals, each of which zones is connected to an assigned one of said terminals and between which zones there is a leakage resistance of a value susceptible of undergoing change, said transistor in response to one voltage condition on said third terminal assuming a conductive state wherein a relatively low impedance path is provided between said first and second terminals to permit bi-directional current translation therebetween and responsive to another voltage condition on said third terminal assuming a non-conductive state wherein a relatively high impedance path is provided between said first and second terminals to prevent the translation of current therebetween; a source of an intelligence signal; means coupling said source to said first terminal for supplying said intelligence signal thereto; a load circuit coupled to said second terminal; means for developing an alternating rectangular shaped switching signal; means for applying said switching signal to said third terminal to alternate said bi-directional transistor between its conductive and non-conductive states intermittently to translate said intelligence signal from said source to said load circuit, said transistor when in its non-conductive state translating undesired current to said load circuit as a result of undesired leakage current flowing through said PN junction; and a fixed resistor, of a value not greater than said leakage resistance, connected between those of said terminals connected to said zones in order that the undesired current in said load circuit be relatively constant and independent of any variations of said leakage resistance.

3. Switching apparatus comprising: a semi-conductor device having one zone of one conductivity type forming a PN junction with another zone of the opposite conductivity type and having a first terminal, a second terminal connected to said one zone, and a third terminal connected to said other zone, and between which zones there is a leakage resistance of a value susceptible of undergoing change, said semi-conductor device in response to one voltage condition on said third terminal assuming a conductive state wherein a relatively low impedance path is provided between said first and second terminals to permit current translation therebetween and responsive to another voltage condition on said third terminal assuming a non-conductive state wherein a relatively high impedance path is provided between said first and second terminals to prevent the translation of current therebetween; a source of a signal; means coupling said source to said first terminal for supplying said signal thereto; a load circuit coupled to said second terminal; means for developing an alternating switching signal; means for applying said switching signal to said third terminal to alternate said semi-conductor device between its conductive and non-conductive states intermittently to translate said signal from said source to said load circuit, said semi-conductor device translating undesired current to said load circuit as a result of undesired leakage current flowing through said PN junction; and a fixed resistor, of a value small compared to said leakage resistance, connected between said second and third terminals in order that the undesired current in said load circuit be relatively constant and independent of any variations of said leakage resistance.

4. Switching apparatus comprising: a semi-conductor device having a zone of one conductivity type interposed between two zones of the opposite conductivity type forming two PN junctions and having a first terminal connected to one of the opposite conductivity type zones, a second terminal connected the other opposite conductivity type zone, and the third terminal connected to the zone of said one conductivity type, and between one of the opposite conductivity type zones and the zone of said one conductivity type there is a leakage resistance of a value susceptible of undergoing change, said semi-conductor device in response to one voltage condition on said third terminal assuming a conductive state wherein a relatively low impedance path is provided between said first and second terminals to permit current translation therebetween and responsive to another voltage condition on said third terminal assuming a non-conductive state wherein a relatively high impedance path is provided between said first and second terminals to prevent the translation of current therebetween; a source of a signal; means coupling said source to said first terminal for supplying said signal thereto; a load circuit coupled to said second terminal; means for developing an alternating switching signal; means for applying said switching signal to said third terminal to alternate said semi-conductor device between its conductive and non-conductive states intermittently to translate said signal from said source to said load circuit, said semi-conductor device translating undesired current to said load circuit as a result of undesired leakage current flowing through said leakage resistance; and a fixed resistor, of a value small compared to said leakage resistance, connected in parallel with said leakage resistance in order that the undesired current in said load circuit be relatively constant and independent of any variations of said leakage resistance.

5. Switching apparatus comprising: a semi-conductor device having a zone of one conductivity type interposed between two zones of the opposite conductivity type forming two PN junctions and having a first terminal connected to one of the opposite conductivity type zones, a second terminal connected to the other opposite conductivity type zone, and a third terminal connected to the zone of said one conductivity type, through each of said junctions there is a leakage resistance of a value susceptible of undergoing change, said semi-conductor device in response to one voltage condition on said third terminal assuming a conductive state wherein a relatively low impedance path is provided between said first and second terminals to permit current translation therebetween and responsive to another voltage condition on said third terminal assuming a non-conductive state wherein a relatively high impedance path is provided between said first and second terminals to prevent the translation of current therebetween; a source of a signal; means coupling said source to said first terminal for supplying said signal thereto; a load circuit coupled to said second terminal; means for developing an alternating switching signal; means for applying said switching signal to said third terminal to alternate said semi-conductor device between its conductive and non-conductive states intermittently to translate said signal from said source to said load circuit, said semi-conductor device translating undesired current to said load circuit as a result of undesired leakage current flowing through both of said PN junctions; a fixed resistor connected across one of said junctions and having a value small compared to the leakage resistance of that junction; and another fixed resistor connected across the other junction and of a value small compared to the leakage resistance of that junction in order that the undesired current in said load circuit be relatively constant and independent of any variations of the leakage resistance through each of said junctions.

6. Switching apparatus comprising: a bi-directional transistor having first and second outer zones of one conductivity type on opposite sides of and contiguous with an intermediate zone of the opposite conductivity type forming two PN junctions through each of which there is a leakage resistance of a value susceptible of undergoing change and responsive to the forward biasing of said intermediate zone with respect to both of said outer zones for assuming a conductive state wherein a relatively low impedance path is provided between said first and second outer zones to permit bi-directional current translation therebetween and responsive to the reverse biasing of said intermediate zone with respect to both of said outer zones for assuming a non-conductive state wherein a relatively high impedance path is provided between said first and second outer zones to prevent the translation of current therebetween; a source of a signal; means coupling said source to said first outer zone for supplying said signal thereto; a load circuit coupled to said second outer zone; means for developing an alternating switching signal, means for applying said switching signal to said intermediate zone to forward and reverse bias said semi-conductor device in alternation to switch said device between its conductive and non-conductive states intermittently to translate said signal from said source to said load circuit, said semi-conductor device translating undesired current to said load circuit as a result of undesired leakage current flowing through at least one of said PN junctions; and a fixed resistor connected across said one PN junction and of a value small compared to the leakage resistance of that junction in order that the undesired current in said load circuit be relatively constant and independent of any variations of that leakage resistance.

7. Switching apparatus comprising: a field-effect transistor having one zone of one conductivity type forming a PN junction with another zone of the opposite conductivity type and having first and second terminals connected to said one zone and a third terminal connected to said other zone, and between which zones there is a leakage resistance of a value susceptible of undergoing change, said field-effect transistor in response to one voltage condition on said third terminal assuming a conductive state wherein a relatively low impedance path is provided between said first and second terminals to permit the translation of current therebetween and responsive to another voltage condition on said third terminal assuming a non-conductive state wherein a relatively high impedance path is provided between said first and second terminals to prevent the translation of current therebetween; a source of a signal; mains coupling said source to said first terminal for supplying said signal thereto, a load circuit coupled to said second terminal; means for developing an alternating switching signal; means for applying said switching signal to said third terminal to alternate said field-effect transistor between its conductive and non-conductive states intermittently to translate said signal from said source to said load circuit, said field-effect transistor translating undesired current to said load circuit as a result of undesired leakage current flowing through said PN junction; and a fixed resistor, of a value small compared to said leakage resistance, connected between said third terminal and one of said first and second terminals in order that the undesired current in said load circuit be relatively constant and independent of any variations of said leakage resistance.

References Cited in the file of this patent

UNITED STATES PATENTS

| | | |
|---|---|---|
| 2,904,705 | Elliot | Sept. 15, 1959 |
| 2,935,623 | Overbeek et al. | May 3, 1960 |